United States Patent [19]

Castleberry

[11] Patent Number: 4,804,953
[45] Date of Patent: Feb. 14, 1989

[54] REDUNDANT CONDUCTOR STRUCTURES FOR THIN FILM FET DRIVEN LIQUID CRYSTAL DISPLAYS

[75] Inventor: Donald E. Castleberry, Schenectady, N.Y.

[73] Assignee: General Electric Company, Schenectady, N.Y.

[21] Appl. No.: 97,247

[22] Filed: Sep. 16, 1987

Related U.S. Application Data

[63] Continuation of Ser. No. 756,640, Jul. 19, 1985, abandoned.

[51] Int. Cl.⁴ .............................................. G09G 3/36
[52] U.S. Cl. ................................... 340/784; 340/719; 350/333; 357/23.7
[58] Field of Search ............... 340/784, 718, 719; 350/333, 334; 357/41, 23.7

[56] References Cited

U.S. PATENT DOCUMENTS

| | | | |
|---|---|---|---|
| 4,368,523 | 1/1983 | Kawate | 350/333 |
| 4,543,573 | 9/1985 | Fuyama et al. | 340/784 |
| 4,582,395 | 4/1986 | Morozumi | 357/23.7 |
| 4,597,001 | 6/1986 | Bortscheller | 357/23.7 |
| 4,673,969 | 6/1987 | Ariizumi et al. | 357/41 |

Primary Examiner—Marshall M. Curtis
Attorney, Agent, or Firm—Marvin Snyder; James C. Davis, Jr.

[57] ABSTRACT

Redundancy is provided in the data and gate lines of the liquid crystal display device for improved reliability and greater fabrication yield. The data lines in particular are preferably fabricated in a multilayer structure with two conductive layers sandwiching a narrow insulating strip. The presence of the insulating strip permits the upper conductive line to be formed without step jumps which can exhibit a tendency for poor electrical connection. The upper and lower conductive layers of the data line are in contact for the length of the lower data line, contact being made on either side of the narrower insulating strip. Similar redundancy, without the necessity of providing an intermediary insulating layer is also provided for the gate lines. The redundancy provided in the present invention is particularly suitable for fabrication methods employed in thin film FET driven LCD devices.

34 Claims, 7 Drawing Sheets

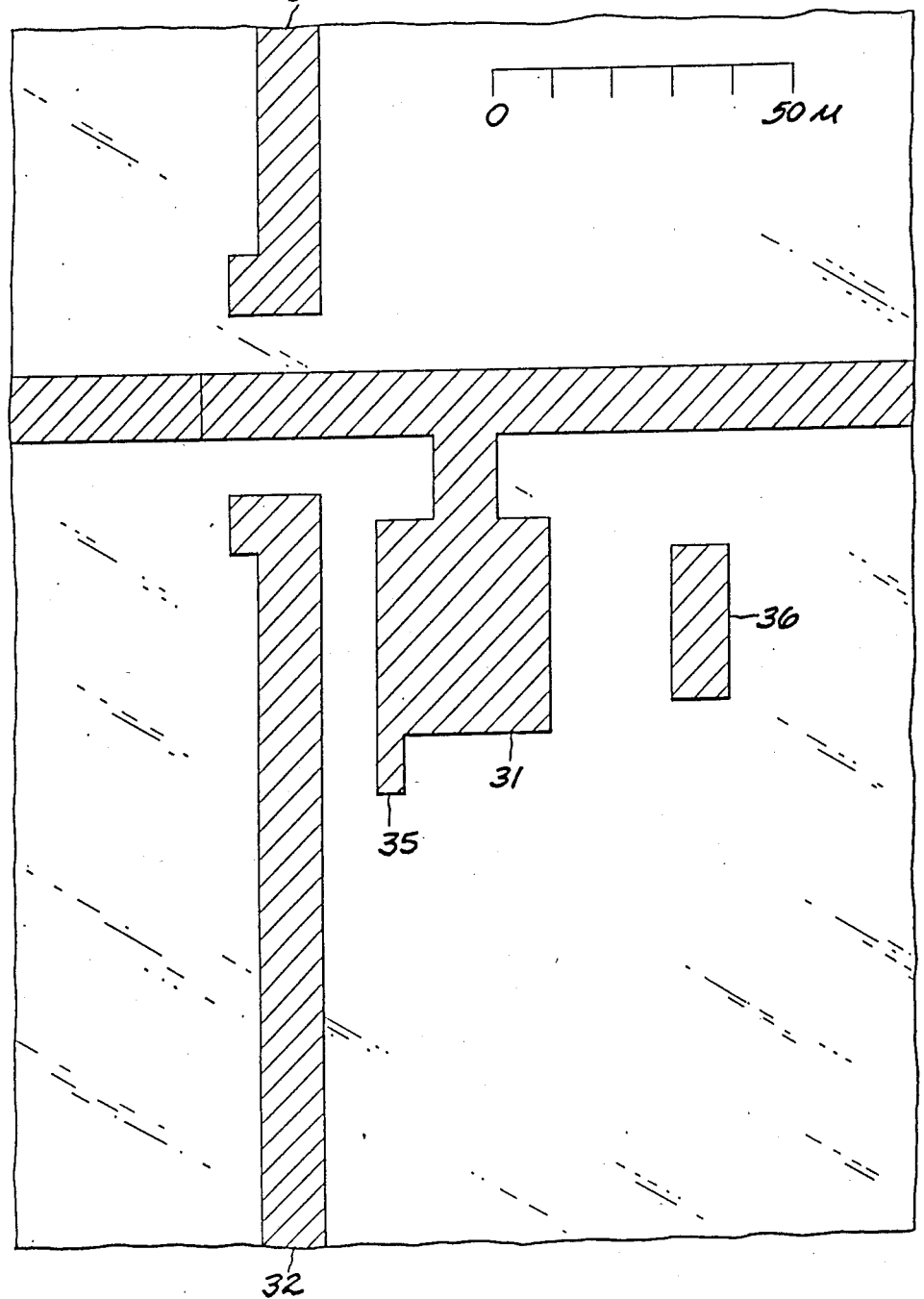

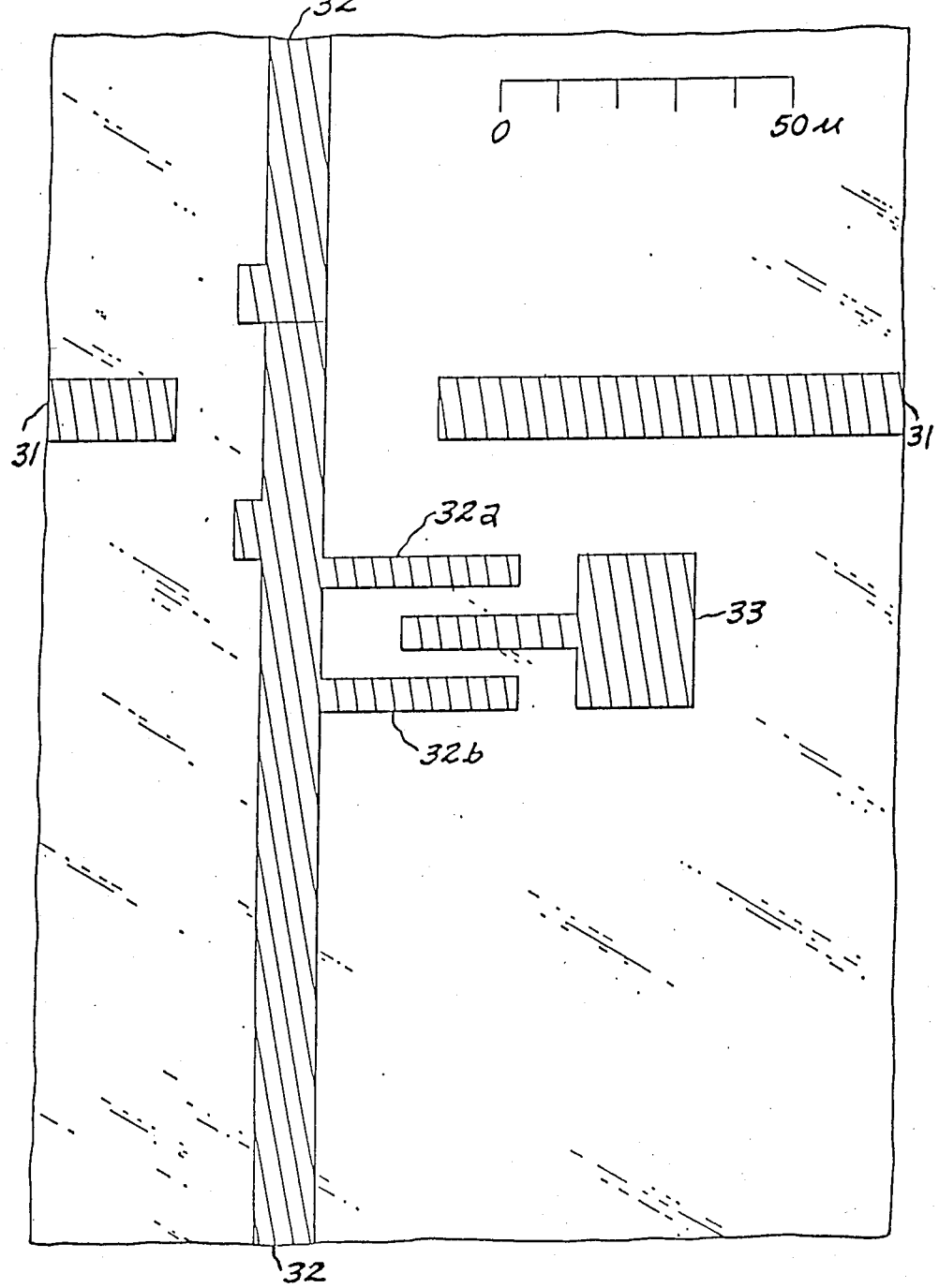

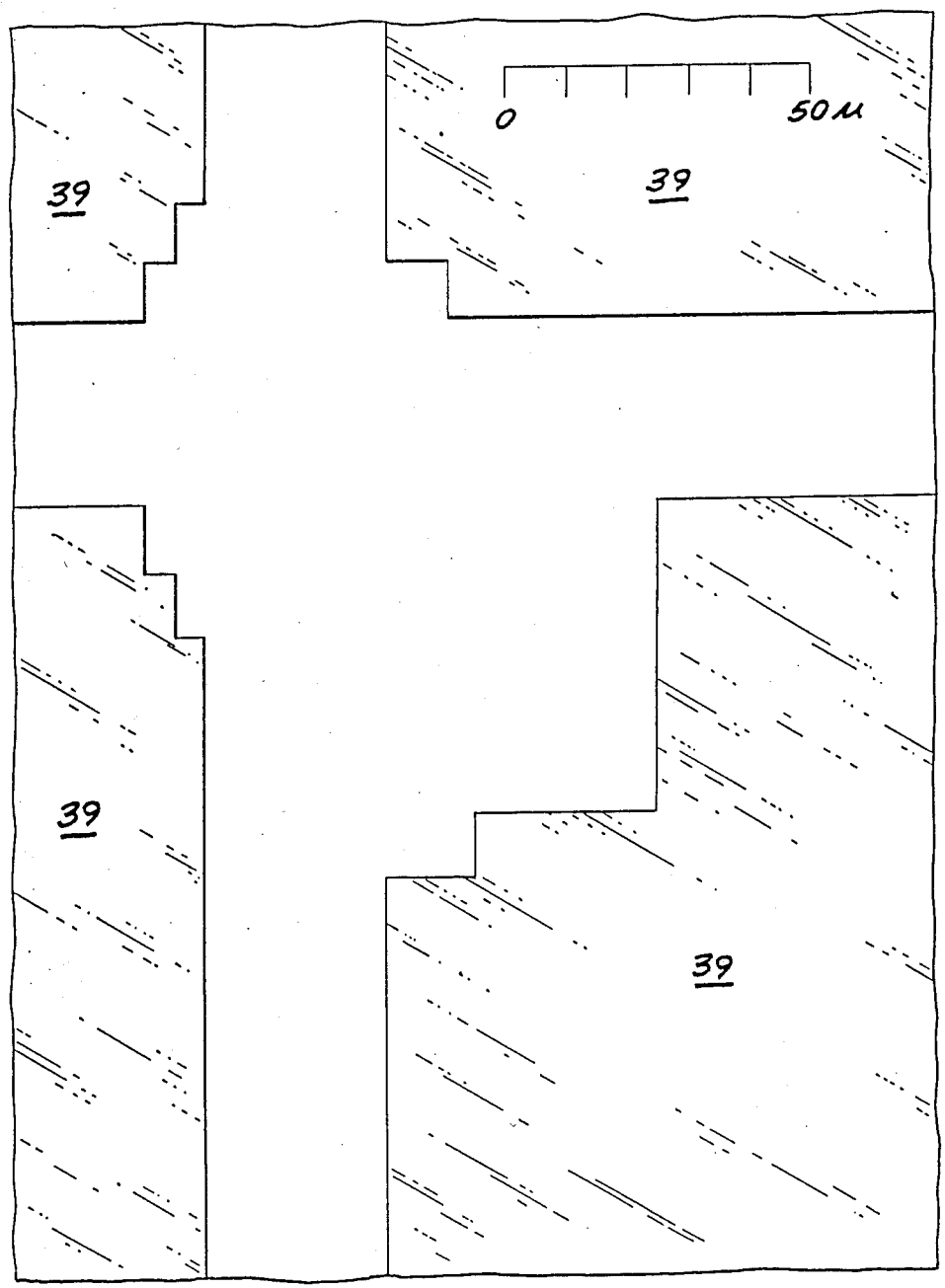

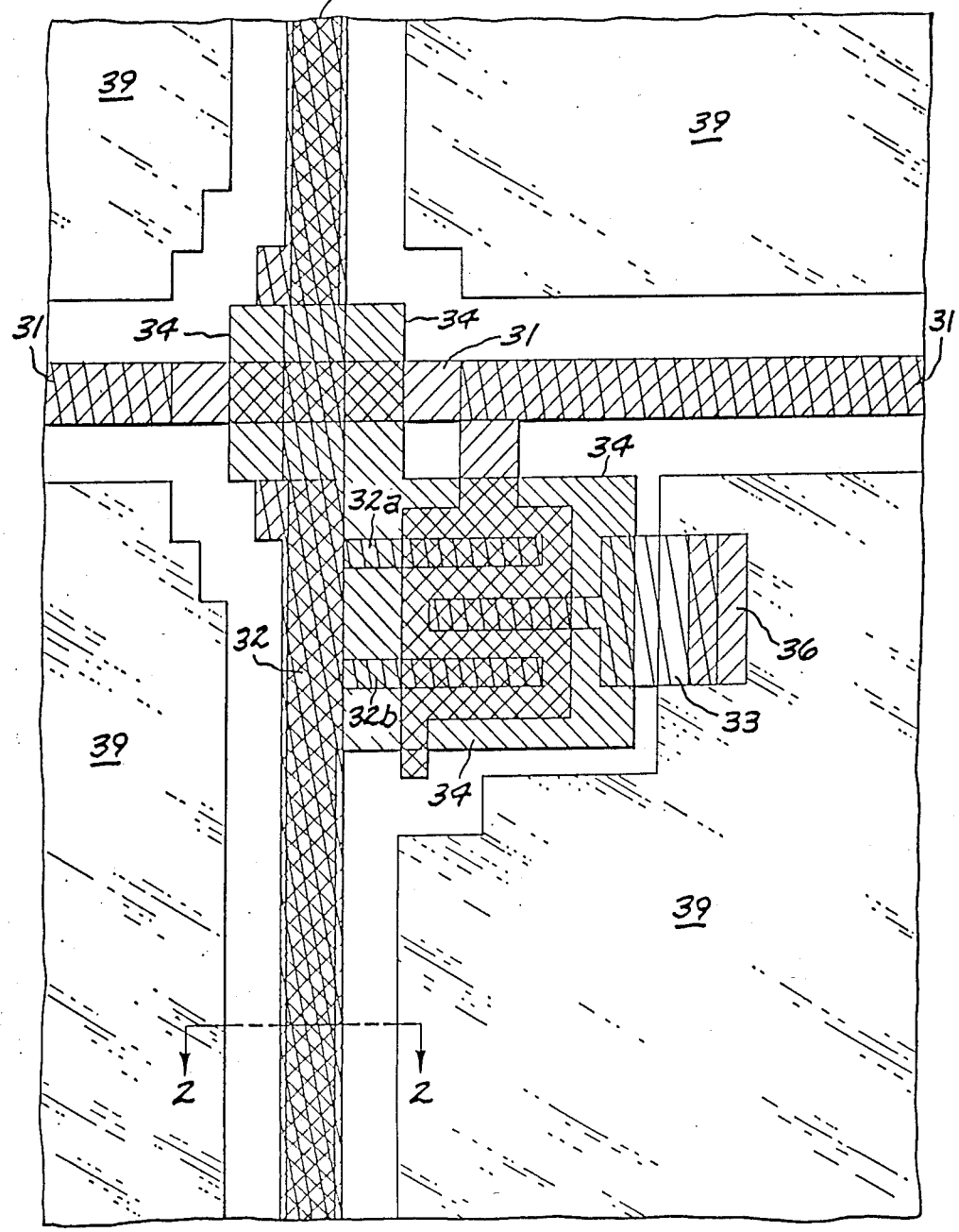

REDUNDANT CONDUCTOR STRUCTURES FOR THIN FILM FET DRIVEN LIQUID CRYSTAL DISPLAYS

This application is a continuation of application Ser. No. 756,640, filed 7/19/85 now abandoned.

BACKGROUND OF THE INVENTION

The present invention is generally directed to the construction of liquid crystal display devices. More particularly, the present invention is directed to redundant conductor structures provided for x and y address lines in liquid crystal display (LCD) devices.

A liquid crystal display device typically comprises a pair of flat panels sealably containing a quantity of liquid crystal material. These liquid crystal materials typically fall into two categories: dichroic dyes in a guest-/host system or twisted nematic materials. The flat panels generally possess transparent electrode material disposed on their inner surfaces in predetermined patterns. One panel is often covered completely by a single transparent "ground plane" electrode. The opposite panel is configured with an array of transparent electrodes, referred to herein as "pixel" (picture element) electrodes. Thus, the typical cell in a liquid crystal display includes liquid crystal material disposed between a pixel electrode and a ground electrode forming, in effect, a capacitor-like structure disposed between transparent front and back panels. In general, however, transparency is only required for one of the two panels and the electrodes disposed thereon.

In operation, the orientation of liquid crystal material is affected by voltages applied across the electrodes on either side of the liquid crystal material. Typically, a voltage applied to the pixel electrode effects a change in the optical properties of the liquid crystal material. This optical change causes the display of information on the liquid crystal display (LCD) screen. In conventional digital watch displays and in newer LCD screens used in miniature television receivers, the visual effect is typically produced by variations in reflected light. However, the utilization of transparent front and back panels and transparent electrodes also permit the visual effects to be produced by transmissive effects. These transmissive effects may be facilitated by separately powered light sources for the display, including fluorescent light type devices. LCD display screens may also be employed to produce color images through the incorporation of color filter mosaics in registration with the pixel electrode array. Some of these structures may employ polarizing filters to either enhance or provide the desired visual effect.

Various electrical mechanisms are employed to sequentially turn on and off individual pixel elements in an LCD display. For example, metal oxide varistor devices have been employed for this purpose. However, the utilization of thin film semiconductor switch elements is most relevant herein. In particular, a preferable switch element comprises a thin film field effect transistor (FET). These devices are preferred in LCD displays because of their potentially small size, low power consumption, switching speeds, ease of fabrication, and compatibility with conventional LCD structures.

The pixel elements in an LCD are typically arranged in a rectangular array of rows and columns. Each pixel electrode is associated with its own FET switch device. Each switch device is connected to a data line and a gate line. Electrical signals applied simultaneously to each of these lines permit each pixel to be addressed independently. Accordingly, the LCD is typically provided with a set of parallel data lines which can be made to address cells in a horizontal or x direction. Likewise, gate lines are provided for accessing cells in a vertical or y direction. In operation, the image on the LCD device may be refreshed at a rate which is typically approximately 60 Hz.

More particularly, amorphous silicon FET addressed liquid crystal matrix displays provide an attractive approach to high contrast, flat panel television type displays. Ideally, in an FET addressed LCD device, when the FET is turned on, the "liquid crystal capacitor" charges to the data or source line voltage. When the FET is turned off, the data voltage is stored on the liquid crystal capacitor.

Specific attention is now directed to certain problems occurring in LCD display devices which are solved by the practice of the present invention. In particular, in thin film FET driven liquid crystal displays, the horizontal and vertical address lines (that is, the gate lines and data lines) must all be continuous. For example, in a display having a matrix of 400×400 pixel cells with a resolution of 4 lines per millimeter (100 lines per inch), the total length of the address lines is approximately 100,000 mm. The width of the lines should be less than approximately 10 microns in order to maintain a high relative percentage of active cell area in the display. In the fabrication of these devices, defects can occur in many of the processing steps. These defects may occur as a result of dust or dirt interfering with metal deposition or adhesion, flaws in photoresist patterns used to etch the metal lines, scratches, etc. Additionally, defects in these lines can result from unsatisfactory step coverage. This occurs in those situations where metal lines are required to traverse a vertical or near vertical side wall structure, for example, in an etched insulating layer. These steps typically occur at points in the device at which the horizontal and vertical lines cross over one another. In integrated circuit fabrication, typical open line defect probabilities for lines of this width are of the order of $10^{-5}$ per mm. It is therefore apparent that methods for reducing the probability of open x and y addressing lines and methods for enhancing the yield of the LCD device are desired.

SUMMARY OF THE INVENTION

In accordance with a preferred embodiment of the present invention, a liquid crystal display comprises a pair of flat substrates with at least one of them being transparent. A quantity of liquid crystal material is disposed and contained between the substrates. An array of pixel electrodes is disposed on at least one of the substrates. At least one ground plane electrode is disposed on the other of the substrates so that liquid crystal material is disposed between the pixel electrodes and any ground plane electrodes. Either the array of pixel electrodes comprise transparent material or the ground plane electrode or electrodes comprise transparent material. In a see-through embodiment of the present invention, both substrates, the ground plane electrode, and the array of pixel electrodes comprise transparent conductive material such as indium tin oxide (ITO). An array of semiconductor switch elements is associated with each pixel electrode. A set of electrically conductive data lines and a set of electrically conductive gate lines are provided and configured with the switch elements so that voltages appearing on the data line are applied to select pixel electrodes.

Most relevantly with respect to the present invention, the semiconductor switch elements preferably comprise thin film field effect transistors. Furthermore, the data lines exhibit a multilayer structure extending for at least a portion of their length with at least two of these layers comprising conductive material in electrical contact along a portion of their length. This structure provides redundancy of up to 90% along the data line length. In a preferred embodiment of the present invention, the data lines comprise a three layer structure with the intermediate layer comprising the same insulating material as the gate insulation for the FET. The first layer of data line metal is preferably deposited at the same time as the gate metal. Accordingly, this metal pattern is incorporated in the gate metal mask pattern. The second or upper conductive layer comprises metal deposited at the same time as the source and drain metal for the FET switches. The presence of the insulating layer and its configuration permit the upper data line layer to be applied without steep step crossovers at the gate line intersections. Electrical contact is established between the conductive layers in the data lines on either side of a narrower strip in the insulating layer. While contact is made along a step structure, the length of this step is much longer, thereby insuring contact at least somewhere along its length. In this way, a redundant data line structure is provided. Similarly, in a preferred embodiment of the present invention, redundancy in the gate line layer is also provided. However, in this situation, it is not necessary to employ an intermediary insulating layer. It is also noted that the roles of the data lines and gate lines may be reversed by varying electrical connections with the switch element.

Accordingly, it is an object of the present invention to provide a mechanism and structure for redundant gate and data lines in liquid crystal display devices.

It is also an object of the present invention to provide LCD display devices having greater reliability.

Lastly, but not limited hereto, it is an object of the present invention to provide improved LCD device structure which are readily manufacturable and which provide improved product yield.

DESCRIPTION OF THE DRAWINGS

FIG. 3A is a plan view illustating a gate metal pattern employed in a preferred embodiment of the present invention;

FIG. 3C is a plan view illustrating a metal pattern for source and drain electrodes and data lines;

FIG. 3D is a plan view illustrating a pattern of pixel electrode material in the neighborhood of a thin film semiconductor switch device;

FIG. 5 is a plan view showing an enlarged view of a portion of FIG. 5;

DETAILED DESCRIPTION OF THE INVENTION

Figure 1:
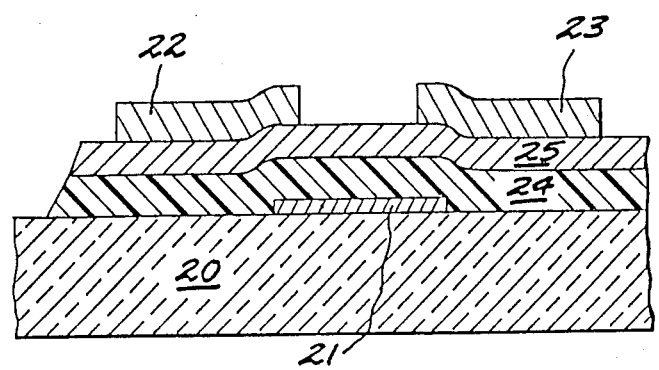
FIG. 1 is a cross sectional side elevation view illustrating a thin film FET.

FIG. 1 illustrates, in cross section, a conventional thin film FET used in LCD devices. In particular, substrate 20 typically comprises a transparent material such as glass. In accordance with conventional photopatterning methods, metal gate electrode 21 is affixed to this substrate. A patterned layer of insulating material 24 such as silicon nitride is then typically deposited so as to cover gate electrode 21 and to extend a certain distance on either side thereof. An active layer of amorphous silicon ($\alpha$-silicon) is then typically applied and doped with appropriate polarity dopants to produce a channel region wherein current flow is controlled by electrical signals applied to the gate electrode. In a similar fashion, source and drain electrodes 22 and 23, respectively, are deposited using photopatterning methods to complete the formation of a thin film FET device. It is noted, however, that the opacity of gate material 21 is not a significant viewing limitation since the gate electrode may only be approximately 10 microns in width and therefore essentially invisible to the user. In contrast, the pixel electrodes are by far the larger elements in an LCD device cell. The pixel electrodes are typically approximately 0.01 inches square.

Figure 2:
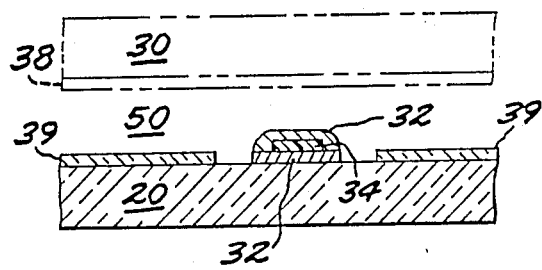
FIG. 2 is a cross sectional end view illustrating a portion of one embodiment of the present invention in which a three layer, partially redundant data line structure is employed.

FIG. 2 is particularly relevant to understanding the present invention. In particular, FIG. 2 is a cross sectional view of a portion of FIG. 5 which is more particularly described below. The upper portion of FIG. 2 is shown in phantom view since these structures are, strictly speaking, not produced by the mask patterns in FIGS. 3A–3D. These mask patterns are typically employed to generate only one side of the substrates or panels which form major constituents in an LCD device. As above, substrates 20 and 30 may typically comprise transparent material. Also, as above, ground plane 38 and pixel electrodes 39 are disposed on substrates 30 and 20, respectively. These electrodes may comprise transparent conductive material. Most relevant to the present invention, however, is the data line structure which includes data lines 32 and insulating material 34. It is seen that the first, conductive layer and the third, conductive layer, both designated by reference numeral 32 are in electrical contact along either side of narrow insulating strip 34. The first, conductive data line layer is preferably fabricated in the same process stage as the gate electrodes of the FET switching elements. The second, insulating layer 34 is preferably fabricated in the same process stage as the gate insulating material. The third, conductive layer in the data line structure is preferably fabricated in the same process stage as the fabrication of the source and drain metallization. The presence of insulating layer 34 permits the third or upper conductive data line layer to cross gate lines, from which it is insulated, without the formation of step discontinuities which tend to decrease circuit reliability. Furthermore, the first or lowermost conductive line is in contact with the upper conductive line and provides redundant circuit connection along approximately 90% of the length of each data line. Lowermost data line 32 is, however, provided with gaps to accommodate passage of gate line conductors. While it appears that a longer step jump is now required for contact between the conductive layers in the data line, this is in fact not a problem since insulating material strip 34 in FIG. 2 is relatively narrow and since electrical contact is now possible along the entire length of the lower data line conductor.

Figure 3B:
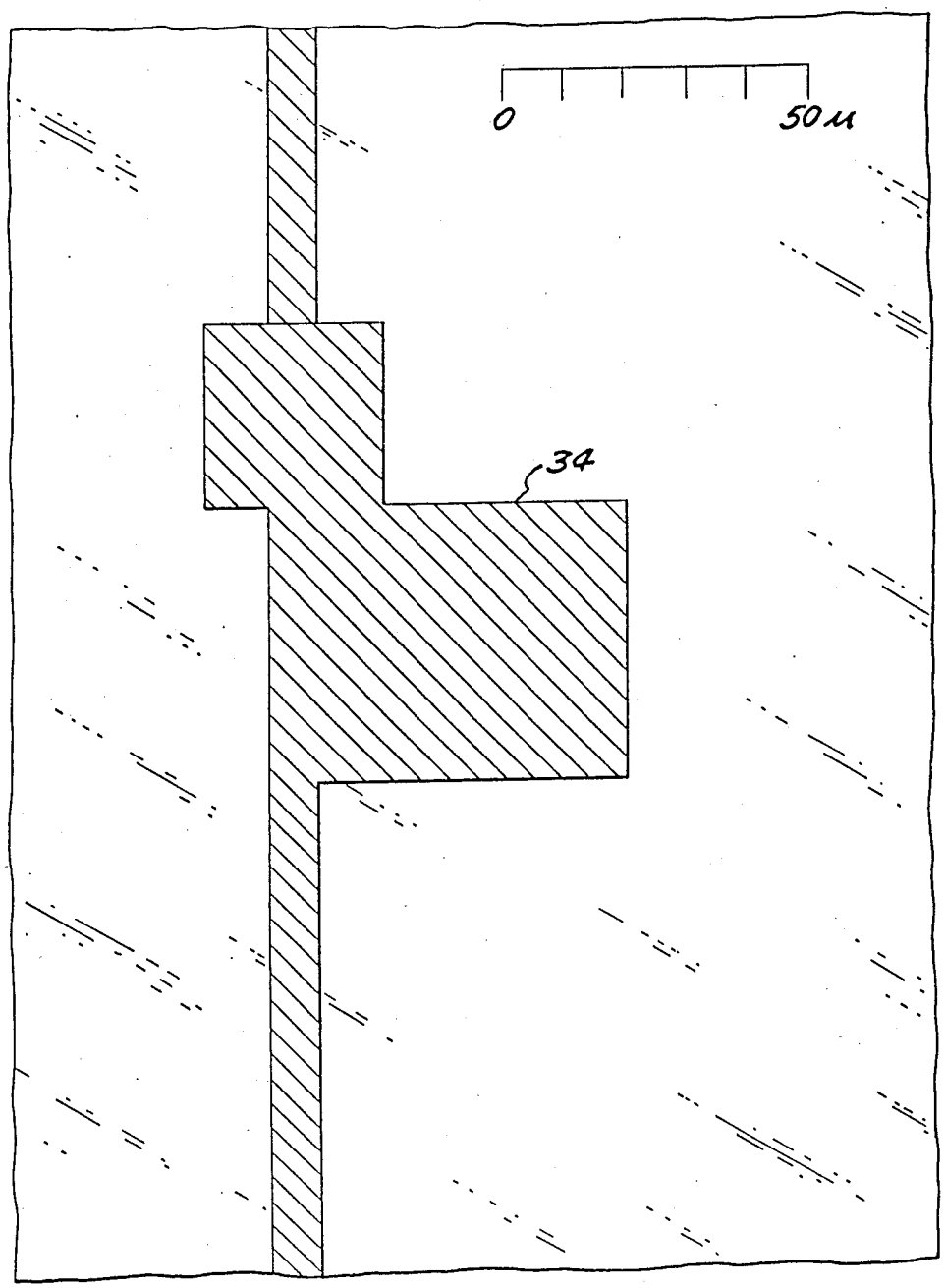
FIG. 3B is a plan view illustrating a pattern for gate insulation and active silicon as part of a thin film FET.

FIGS. 3A–3D are layout patterns employable in the fabrication of the present invention. FIG. 3A illustrates a pattern for gate metal and associated horizontal gate drive lines 31. A scale is provided for reference. Additionally, FIG. 3A illustrates the presence of redundant data line 32. These lines are redundant in the sense that they do not form a complete electrical circuit in the layer shown but instead partially duplicate data line paths which are completed in whole in another layer as shown in FIG. 3C. Nonetheless, connection is provided to complete the data line circuit, as shown in FIG. 3C. The metallization layer shown in FIG. 3A is preferably opaque so as to prevent light from reaching the channel regions from one side of the display. The channel regions are formed above the large rectangular area shown in FIG. 3A. Metallic pad 36 is also shown in the layer illustrated in FIG. 3A. Pad 36 facilitates electrical connection between the device drain and the pixel electrode.

After the metallization layer of FIG. 3A is formed on an opaque substrate or on a transparent substrate such as glass, the pattern of FIG. 3B is employed in the deposition of insulating and semiconducting layers. In particular, a layer of silicon nitride or other insulating material is deposited in the pattern shown in FIG. 3B. The insulating material pattern shown in FIG. 3B serves several purposes. Firstly, this pattern provides gate insulating material for thin film FET devices. Secondly, this insulating layer is disposed so as to electrically insulate the gate lines from the data lines. Lastly, it is noted that the vertical portions extending upwardly and downwardly from the central patch region of FIG. 3B overlie data lines 32 shown in FIG. 3A. However, it is noted that the insulating layer in FIG. 3B is narrower than data line 32 in FIG. 3A. This permits the formation of a partially redundant data line as shown in FIG. 3C. Because the width of insulating layer 34 in FIG. 3B is narrower, electrical contact is thereby permitted between the data line conductors shown in FIGS. 3A and the complete data line conductors shown in FIG. 4C, both of which are indicated by reference numeral 32. FIG. 2 provides a cross sectional view of the resulting structure.

As pointed out above, the pattern of FIG. 3B is employed to serve an additional function. In particular, it serves as a pattern for the deposition of a layer or layers of semiconductor material. In particular, it is preferable to employ a triple layer having the pattern shown in FIG. 3B. In this case, the lowermost (that is, first) layer comprises silicon nitride, the next layer comprises α-silicon, and the next layer comprises α-silicon doped with material so as to provide the layer with an N+polarity. These layers are formed using conventional thin film FET processing.

The next layer applied to the substrate is a metallization layer having the configuration illustrated in FIG. 3C. In particular, the finger projections 32a and 32b extend from data line 32. These projections form source electrodes for an FET. Metallization pattern 33 provides a common drain electrode for the FET formed. This drain electrode is ultimately connected to pixel electrode 39 shown in FIGS. 2, 6, and 3D. It is also in electrical contact with pad 36 in FIG. 3A. Data line 32 is connected to source electrodes 32a and 32b and in addition, because of the narrower width of insulating layer of FIG. 3B, data line 32 is in contact with the partially redundant data line having the same reference numeral in the layer of FIG. 3A. This provides a redundant structure for increased display reliability. It is also noted that gate line 31 is provided with enhanced metallization from the layer of FIG. 3C, again to provide enhanced display reliability.

The next layer to be applied is the layer of pixel electrode patterns. The pixel electrodes must necessarily comprise electrically conductive material. However, depending upon the specific nature of the LCD device, the electrically conductive material may or may not be transparent. However, for transparency, indium tin oxide is preferably employed for this purpose. Accordingly, although pixel electrodes 39 comprise electrically conductive material, they are hatched as glass in figures herein to suggest their potentially transparent nature. It is, of course, required that either the ground plane electrodes or the pixel electrodes, or both, comprise transparent material. If they are both opaque, the purpose of the display is defeated. With further reference to the pixel electrodes, it is noted that FIG. 3D illustrates the presence of four such pixel electrodes. However, the semiconductor switch is in fact associated with the pixel electrode 39 in the lower righthand corner of FIG. 3D. This pixel electrode is in electrical contact with metal (drain) pad 33 in FIG. 3C.

Figure 4:
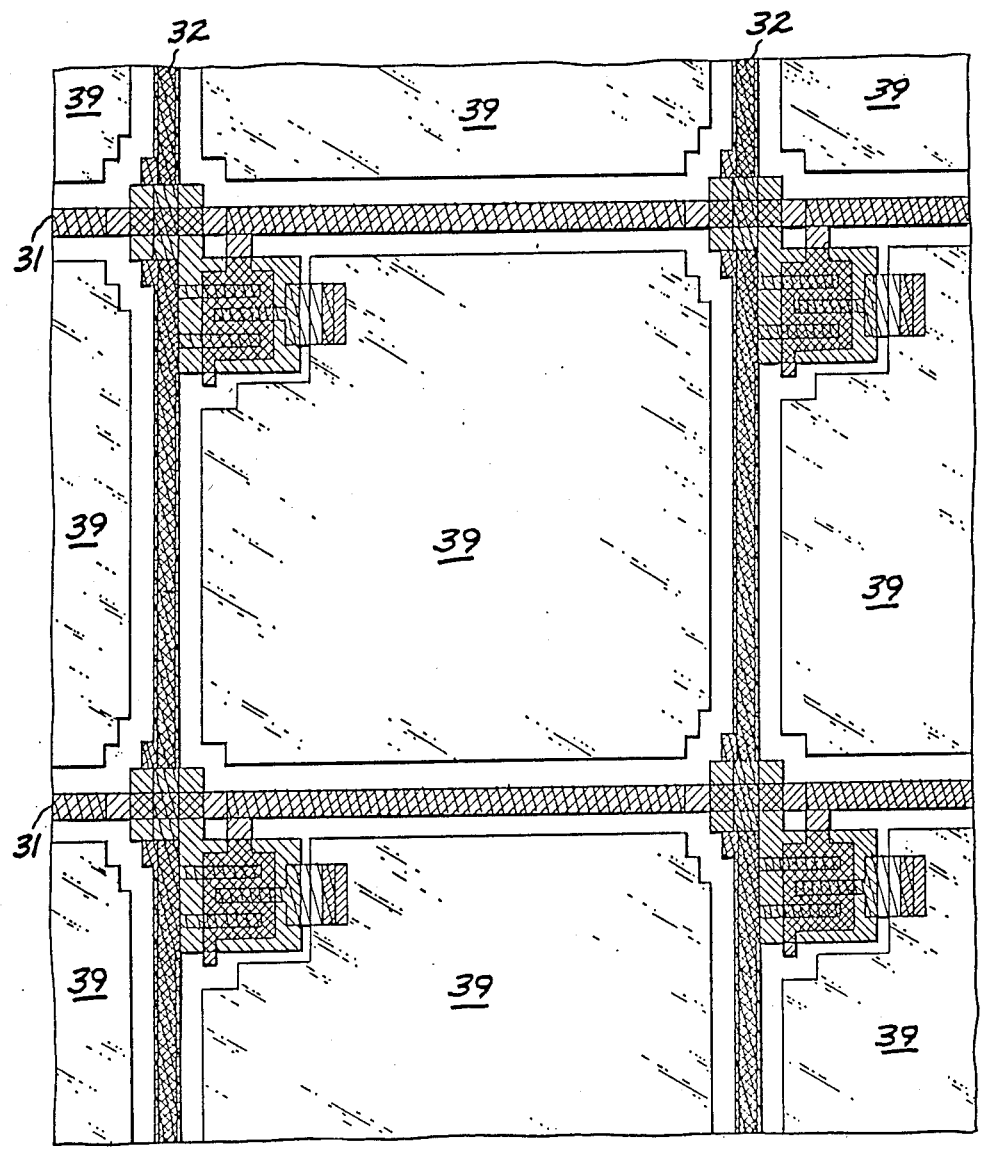
FIG. 4 is a plan view illustrating a portion of an LCD device made in accordance with the present invention.

FIG. 4 illustrates in an enlarged view, a single pixel cell and portions of the cells which surround it. The gate lines associated with the cells are shown extending in a horizontal direction. The data lines associated with the cells are shown extending in a vertical direction. It is noted, however, that the relative directionality of these lines is not fixed and that alternate configurations may be employed in which the horizontal and vertical roles are reversed. Additionally, each pixel cell is seen to be uniquely associated with a selected data line and gate line. Each pixel cell is seen to include a pixel electrode and its associated semiconductor switching device. The structure seen in FIG. 4 typically comprises one side of a liquid crystal display device. The other side typically comprises a ground plane electrode disposed on a transparent substrate. Liquid crystal material is disposed between the pixel electrodes and the ground plane electrode or electrodes. While the pixel cells shown in FIG. 4 are square, it is also possible to employ cells of differing shapes or varying sizes. Likewise, while the data lines and gate lines are shown extending in horizontal and vertical directions, it is also possible to employ data lines disposed so as to more closely resemble oblique coordinate systems.

FIG. 5 provides a detailed view of the structure that results from the fabrication steps performed using the patterns shown in FIGS. 4A–4D. FIG. 5 provides an overview of the resulting structure and serves to more particularly describe interlayer structural relationships. FIG. 5 is also notable for the presence of section line 2 referring particularly to FIG. 2 which show the cross section of a typical data line.

Figure 6:
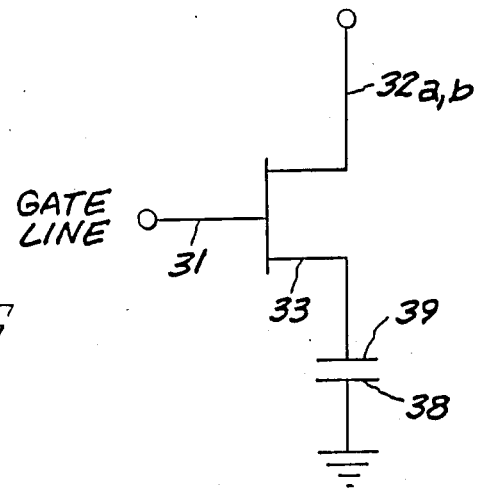
FIG. 6 is a schematic diagram illustrating an electrical model for the semiconductor switch devices associated with each pixel electrode.

FIG. 6 provides an electrical schematic diagram for a single pixel cell. In particular, a capacitor symbol with upper plate 39 and lower plate 38 is employed to represent and suggest the capacitor portion of the cell. Lower plate 38 typically comprises the ground plane electrode and upper plate 39 typically comprises the individual pixel electrodes. The pixel electrodes are electrically connected to drains 33 of FET with gate 31 and source electrodes 32a and 32b. The gate lines and data lines are as shown in FIG. 6. It should be noted, however, that references herein to source and drain electrodes are exemplary only. As is well known in the art, FET devices often exhibit symmetries in which source and drain designations exist only for convenience or as a result of external device connections.

It is also possible to fabricate liquid crystal display devices which display color images rather than monochrome ones. In such devices, a mosaic color filter is typically employed. This color filter is preferably disposed over the ground plane electrode. In accordance with the present invention, it is also possible to dispose spacer material on this filter. However, this is a less desirable arrangement for the reason that the color filter layer must be accurately registered and aligned with respect to the thin film transistor array and the associated pixel electrodes.

As indicated above, different forms of liquid crystal material may be employed in the present invention. In the event that twisted nematic materials are employed, a pair of polarizers are also required. These polarizers are typically disposed external to the walls of the LCD device which contain the liquid crystal material. In LCD devices employing dichroic dyes (guest/host systems), polarizer pairs are no longer required. In these embodiments, systems with either a single polarizer or no polarizers at all may be employed.

Accordingly, from the above, it may be appreciated that the liquid crystal display device of the present invention provides improved display performance, manufacturing yield and is compatible with conventionally employed LCD device fabrication methods. It is also seen that the present invention facilitates the formation of complete, high quality, high contrast images, even color images.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A liquid crystal display comprising:
    a pair of flat substrates, at least one of which is transparent;
    a quantity of liquid crystal material disposed and contained between said substrates;
    an array of pixel electrodes disposed on at least one of said substrates;
    at least one ground plane electrode disposed on the other one of said substrates, so that liquid crystal material is disposed between said pixel electrodes and any of said ground plane electrodes, with at least one of said ground electrodes and said array of pixel electrodes being transparent;
    an array of thin film field effect transistor switch elements associated with said pixel electrodes;
    a set of electrically conductive data lines, said data lines having a multilayer structure including an insulative layer, said multilayer structure extending for at least a portion of the length of said data lines, with at least two of these layers comprising conductive material disposed above and below said insulative layer and in electrical contact along a portion of the length of said data lines; and
    a set of electrically conductive gate lines, said switch elements, said data lines and said gate lines being electrically connected so as to permit voltages appearing on said data lines to be applied to select pixel electrodes in accordance with signals present on said gate lines, said gate lines and said data lines being insulated from one another by means of said insulative layer in said multilayer data lines, said multilayer insulative layer extending across said gate lines so that data line conductors cross said gate lines without traversing substantially vertical step discontinuities.

2. The display of claim 1 in which said switch elements include a gate metal layer, a gate insulating layer and distinct source and drain patterns in a metal layer overlying said gate insulation layer.

3. The display of claim 2 in which said multilayer structure includes three layers.

4. The display of claim 3 in which said data lines include a first, conductive layer disposed in the same layer as said gate metal.

5. The display of claim 4 in which said first data line layer includes gaps through which said gate lines pass.

6. The display of claim 5 in which said data lines include a second, insulating layer disposed in the same layer as said gate insulation.

7. The display of claim 1 in which said data lines include a third, substantially continuous, conductive layer disposed over said insulating layer.

8. The display of claim 6 in which said data lines include a third, substantially continuous, conductive layer disposed in the same layer as said source and drain metal patterns.

9. The display of claim 1 in which said electrical contact is made on either side of said insulation layer.

10. The display of claim 1 in which said gate lines include first and second conductive layers.

11. The display of claim 2 in which said gate lines comprise conductive material in said first layer thereof lying in the same layer as said gate metal with said second layer conductive material applied in the same layer as said source and drain patterns.

12. The display of claim 11 in which said second layer of said gate lines include gaps through which said data lines pass.

13. The display of claim 11 in which said first layer of said gate lines is substantially continuous.

14. The display of claim 1 in which said electrically conductive gate lines, said switch elements, and said data lines are electrically connected so as to reverse the roles of said gate lines and said data lines with respect to their extending in horizontal and vertical directions.

15. The display of claim 1 in which said switch elements comprise amorphous silicon field effect transistors.

16. A liquid crystal display comprising:
    a pair of flat substrates, at least one of which is transparent;
    a quantity of liquid crystal material disposed and contained between said substrates;
    an array of pixel electrodes disposed on said at least one substrate;
    at least one ground plane electrode disposed on the other of said substrates, so that liquid crystal material is disposed between said pixel electrodes and said ground plane electrode said ground plane electrode and said array of pixel electrodes being transparent;
    an array of thin film field effect transistor switch elements associated with said pixel electrodes, said transistor switch elements including source and drain electrodes with at least one of said electrodes exhibiting multiple finger projections;

a set of electrically conductive data lines said data lines having a multilayer structure including an insulative layer, said multilayer structure extending for at least a portion of the length of said data lines; and a set of electrically conductive gate lines, said switch elements, said data lines and said gate lines being electrically connected to permit voltages appearing on said data lines to be applied to said pixel electrodes in accordance signals present on said gate lines said gate lines and said data lines being insulated from one another by means of said insulative layer, said insulative layer extending across said gate lines so that said data lines cross said gate lines without transversing substantially vertical step discontinuities.

17. The display of claim 16 in which said thin film field effect transistor switch elements include amorphous silicon transistors.

18. A liquid crystal display comprising:

a pair of flat substrates, at least one of which is transparent;

a quantity of liquid crystal material disposed and contained between said substrates;

an array of pixel electrodes disposed on at least one of said substrate;

at least one ground plane electrode disposed on the other one of said substrates, so that liquid crystal material is disposed between said pixel electrodes and said ground plane electrodes, with at least one of said ground plane electrodes and said array of pixel electrodes being transparent;

an array of thin film field effect transistor switch elements associated with said pixel electrodes, said transistor switch elements having source and drain electrodes with at least one of said electrodes exhibiting multiple projections;

a set of electrically conductive data lines, said data lines having a multilayer structure including an insulative layer, said multilayer structure extending for at least a portion of the length of said data lines with at least two of said layers comprising conductive material in electrical contact along a portion of the lengths of said data lines; and a set of electrically conductive gate lines, said switch elements, said data lines and said gate lines being electrically connected so as to permit voltages appearing on said data lines to be applied to select pixel electrodes in accordance with signals present on said gate lines, said gate lines and said data lines being insulated from one another by means of said insulative layer in said multilayer data lines, said multilayer insulative layer extending across said gate lines so that data line conductors cross said gate lines without traversing substantially vertical step discontinuities.

19. The display of claim 18 in which said switch elements include a gate metal layer, a gate insulation layer and distinct source and drain patterns in a metal layer overlying said gate insulation layer.

20. The display of claim 1 in which said multilayer structure includes three layers.

21. The display of claim 20 in which said data lines include a first, conductive layer disposed in the same layer as said gate metal.

22. The display of claim 21 in which said first data line layer includes gaps through which said gate lines pass.

23. The display of claim 22 in which said data lines include a second, insulative layer disposed in the same layer as said gate insulation.

24. The display of claim 23 in which said second insulative layer extends across said gate lines, whereby additional data line conductor lines cross said gate lines without traversing vertical step jumps.

25. The display of claim 24 in which daid data lines include a third, substantially continuous, conductive layer disposed over said second, insulative layer.

26. The display of claim 24 in which said data lines include a third, substantially continuous, conductive layer disposed in the same layer as said source and drain metal patterns.

27. The display of claim 24 in which said data lines include a third, substantially continuous, conductive layer in contact with said first, conductive layer.

28. The display of claim 27 in which said contact is made on either side of said insulation layer.

29. The display of claim 18 in which said gate lines include first and second conductive layers.

30. The display of claim 29 in which said gate lines comprise conductive material in said first layer thereof lying in the same layer as said gate metal with said second layer conductive material applied in the same layer as said source and drain patterns.

31. The display of claim 30 in which said second layer of said gate lines includes gaps through which said data lines pass.

32. The display of claim 30 in which said first layer of said gate lines is substantially continuous.

33. The display of claim 18 in which said electrically conductive gate lines, said switch elements and said data lines are electrically connected so as to reverse the roles of said gate lines and said data lines with respect to their extending in horizontal and vertical directions.

34. The display of claim 18 in which said switch elements comprise amorphous silicon field effect transistors.

* * * * *